(12) United States Patent
Carey et al.

(10) Patent No.: US 11,522,709 B2
(45) Date of Patent: Dec. 6, 2022

(54) ACCESS CONTROL SYSTEM

(71) Applicant: HANGAR HOLDINGS PTY LTD, Cheltenham (AU)

(72) Inventors: Peter Carey, Cheltenham (AU); Alex Taylor, Cheltenham (AU); Albert Issa, Cheltenham (AU)

(73) Assignee: HANGAR HOLDINGS PTY LTD, Cheltenham (AU)

( * ) Notice: Subject to any disclaimer, the term of this patent is extended or adjusted under 35 U.S.C. 154(b) by 224 days.

(21) Appl. No.: 16/610,705

(22) PCT Filed: May 1, 2018

(86) PCT No.: PCT/AU2018/050398
§ 371 (c)(1),
(2) Date: Nov. 4, 2019

(87) PCT Pub. No.: WO2018/201187
PCT Pub. Date: Nov. 8, 2018

(65) Prior Publication Data
US 2020/0153631 A1 May 14, 2020

(30) Foreign Application Priority Data

May 4, 2017 (AU) .............................. 2017901631

(51) Int. Cl.
*H04L 9/32* (2006.01)
*G07C 9/27* (2020.01)
(Continued)

(52) U.S. Cl.
CPC .......... *H04L 9/3236* (2013.01); *G06F 21/335* (2013.01); *G07C 9/10* (2020.01); *G07C 9/257* (2020.01); *G07C 9/27* (2020.01); *H04L 9/3213* (2013.01)

(58) Field of Classification Search
CPC ....... H04L 9/3236; H04L 9/3213; H04L 9/32; H04L 63/101; H04L 63/107;
(Continued)

(56) References Cited

U.S. PATENT DOCUMENTS 7,673,142 B2    3/2010  Jeffries et al.
9,098,678 B2    8/2015  Hao et al.
(Continued)

OTHER PUBLICATIONS

Abukeshipa, A., and Tawfiq SM Barhoom. "Implementing and Comprising of OTP Techniques (TOTP, HOTP, CROTP) to Prevent Replay Attack in RADIUS Protocol." (2014). (Year: 2014).*

*Primary Examiner* — Techane Gergiso
(74) *Attorney, Agent, or Firm* — Hayes Soloway PC

(57) ABSTRACT

An access control system which relies at least in part on a non-networked path for permitting an entity access to a secured location; the entity identified by the system by means of a unique entity identifier accorded the entity; entry to said secured location secured by a barrier; said barrier identified by the system by means of a unique barrier identifier accorded the barrier; said system including a local access unit located local to the barrier; said system including a barrier controller for actuation of the barrier; said local access unit issuing an open signal to the barrier controller whereby the barrier permits the entity access to the secured location if and only if data contained in a token communicated from an un-trusted communications device to the local access unit is verified by the local access unit with respect to at least a first parameter by the local access unit.

15 Claims, 6 Drawing Sheets

(51) Int. Cl.
*G07C 9/10* (2020.01)
*G07C 9/25* (2020.01)
*G06F 21/33* (2013.01)

(58) Field of Classification Search
CPC ..... H04L 9/3247; H04L 9/3297; H04L 29/08; H04L 63/0807; H04L 63/10; H04L 67/18; H04L 69/28; G07C 9/27; G07C 9/257; G07C 9/10; G07C 9/00; G07C 9/00174; G07C 9/00563; G07C 9/00571; G07C 2209/08; G06F 21/335; G06F 21/33; G06F 16/29; H04W 4/029; H04W 4/80; H04W 12/64; H04W 12/63; H04W 4/027; G07B 15/04

See application file for complete search history.

(56) References Cited

U.S. PATENT DOCUMENTS

| | | | |
|---|---|---|---|
| 10,360,363 B1* | 7/2019 | Grasberg | G06F 16/245 |
| 2004/0012481 A1 | 1/2004 | Brusseaux | |
| 2006/0103503 A1 | 5/2006 | Rodriguez | |
| 2007/0043954 A1* | 2/2007 | Fox | H04L 9/3271 |
| | | | 713/185 |
| 2008/0191009 A1* | 8/2008 | Gressel | H04W 4/021 |
| | | | 235/382 |
| 2009/0032585 A1* | 2/2009 | Kocznar | E06B 11/085 |
| | | | 235/382 |
| 2009/0132813 A1* | 5/2009 | Schibuk | G06Q 20/4014 |
| | | | 726/9 |
| 2010/0077474 A1* | 3/2010 | Yacoub | G07C 9/27 |
| | | | 726/20 |
| 2012/0252365 A1* | 10/2012 | Lam | G07C 9/00309 |
| | | | 455/41.2 |
| 2013/0326595 A1 | 12/2013 | Myers et al. | |
| 2014/0068247 A1 | 3/2014 | Davis et al. | |
| 2014/0351911 A1* | 11/2014 | Yang | H04L 63/0807 |
| | | | 726/7 |
| 2014/0375422 A1* | 12/2014 | Huber | G07C 9/00571 |
| | | | 340/5.61 |
| 2016/0284183 A1* | 9/2016 | Trani | G07C 9/28 |
| 2016/0358391 A1* | 12/2016 | Drako | G06K 7/1408 |

* cited by examiner

LOCAL ACCESS UNIT FLOW CHART

DATA VALIDATION FLOW CHART

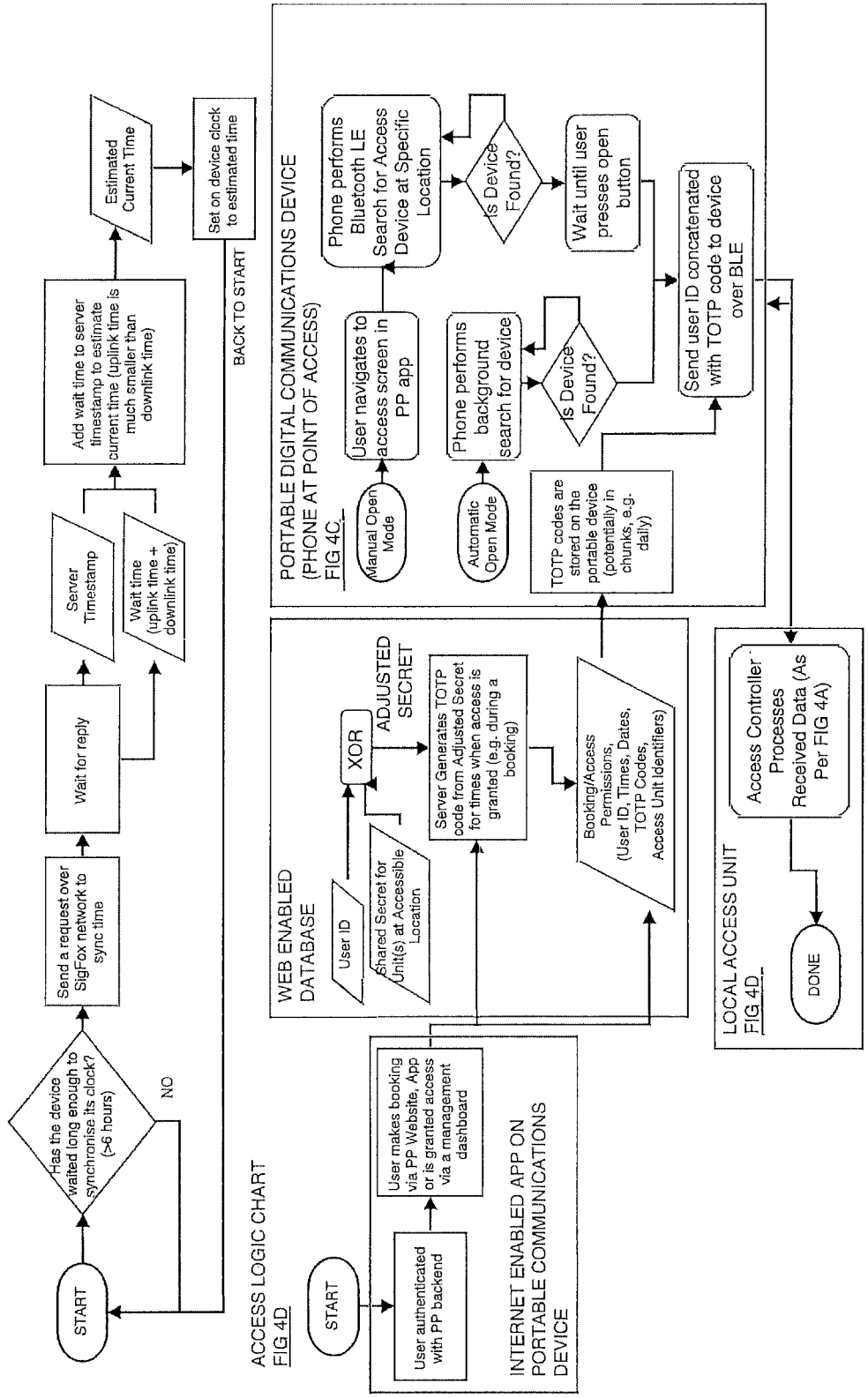

ACCESS CONTROL SYSTEM

TECHNICAL FIELD

The present invention relates to a system of authorization for access to a secured area.

BACKGROUND

Some areas, such as carparks and buildings need to be secured so that only those pre-authorised are able to enter the area. Thus a local access unit is required.

Traditionally pre-authorization may be achieved by giving an individual the gate code to be manually entered.

The problem with single code systems is that once an individual is granted access it cannot be revoked. Denial of access cannot be effected without changing the code and then reissuing a new code to all individuals still requiring access. In addition, it is possible for man in the middle attacks or brute force code cracking to occur.

More sophisticated systems can grant access using a personalized encoded device, which is given to the individual.

The problem with this is that the individual must be physically given the encoded device. If the area is for a large number of visitors, which may only require access a limited number of times, or out of hours having to physically be issued an encoded device becomes an annoyance.

To personalize access to a specific vehicle or person and not require a personalized encoded device to be passed to the individual a license plate, face, or fingerprint recognition could be used.

Such a system frequently requires internet access and direct wiring to the security system of the building, making installation time-consuming and expensive.

An alternative presented to overcome the problem of physically passing a personalized encoded device is to use the individual's mobile phone. A code may be sent to the mobile phone for example a QR code or a manual code may be sent to an authorised person's mobile phone and this can be held up to the scanner. This system still requires internet access and direct wiring to the security system of the building, so that the local access unit can also receive the code sent to the authorised person's phone from a central server.

Codes sent to a mobile phone can be intercepted and so are "insecure".

An alternative use of mobile phones (US 2013326595) is to have the phone issue a request to a central server (e.g. via mobile internet) that then completes the approval and grants access to have the database of individuals allowed to access an area stored on the local access unit itself which is accessed following a direct request (e.g. via blue tooth) from the mobile phone itself (US 2013326595, US 20040012481A1), which may or may not include a payment at the time of access being granted.

If a central server is used to grant access or to process payments then the server must be directly connected to the local access unit, for example via the internet. If the local access unit stores a local database then the database needs to be updated by an authorised user before a new mobile can be paired and allowed to make access requests.

To overcome the need for the local access unit to be in continual contact with a central server, or to have an internal database, the local access unit on installation may be configured to only accept codes based on the current time and a pre-determined secret. In one configuration the local access unit may store codes for a number of different time slots, which may be concurrent or sequential. Any individual presenting a matching code for a current time block will be granted access (US 20140068247).

An individual receives the code from a central server once authorized. The limitation of such a system is that individual users are not identified by the local access unit, and so anyone with the correct code will be admitted access, or the same individual may enter the area multiple times for the same time block.

Embodiments of the present invention seek to address or ameliorate one or more of the above-mentioned problems.
Notes The term "comprising" (and grammatical variations thereof) is used in this specification in the inclusive sense of "having" or "including", and not in the exclusive sense of "consisting only of".

The above discussion of the prior art in the Background of the invention, is not an admission that any information discussed therein is citable prior art or part of the common general knowledge of persons skilled in the art in any country.

SUMMARY OF INVENTION

Definitions

Local access unit: A device which uses the data contained in a token transmitted to the local access unit by a signal sent by the individual or entity seeking access and grants or denies access according to predefined criteria at least in part determined by the data contained in the token.

Portable digital communications device: a portable device which contains at least a processor and memory able to execute a program or application together with input/output capability including at least a short range transmitter/receiver and a long-range transmitter/receiver. An example of such a device is a smart phone as manufactured and sold by entities such as Apple Corporation and Samsung.

Token: also called a session token or a security token—in this specification a token contains data and is transmitted as a unit to a local access unit (see definition above).

Man in the middle attack (abbreviated to MITM): an unauthorized individual observes the entering of a code, or intercepts the code being transmitted and thus learns the code.

Personalized encoded device: Something that stores a code and may be read by an installed scanning device. The most widely used such system is a swipe card.

Alphanumeric sequence: an alphanumeric sequence is a sequence of characters. The characters may represent numbers or symbols of an alphabet. The sequence may comprise combinations of these. In some circumstances they comprise only of numbers or only of symbols. The alphanumeric sequence may represent a number system in any base—for example but not limited to base 2 or base 16

Accordingly in one broad form of the invention there is provided, an access control system which relies at least in part on a non-networked path for permitting an entity access to a secured location;
  the entity identified by the system by means of a unique entity identifier accorded the entity;
  entry to said secured location secured by a barrier;
  said barrier identified by the system by means of a unique barrier identifier accorded the barrier;
  said system including a local access unit located local to the barrier;

said system including a barrier controller for actuation of the barrier;

said local access unit issuing an open signal to the barrier controller whereby the barrier permits the entity access to the secured location if and only if data contained in a token communicated from an un-trusted communications device to the local access unit is verified by the local access unit with respect to at least a first parameter by the local access unit.

Preferably, the data in the token is created by a step of hashing data at a location remote from the local access unit.

Preferably, the token contains an alphanumeric sequence made up of a hashed value and a non-hashed value.

Preferably, the step of token creation is not performed by the local access unit.

Preferably, the step of hashing is performed at a location not in direct networked communication with the local access controller.

Preferably, the step of hashing is performed at a web enabled database located remote from the local access unit.

Preferably, the local access unit includes a short range communications module for communication with the un-trusted communications device.

Preferably, the local access unit does not include a long-range communications module.

Preferably, the first parameter is time.

Preferably, the first parameter is a barrier open time.

Preferably, the first parameter is a pre-authorised barrier open time.

Preferably, the first parameter is a preauthorised barrier open time authorised with respect to the unique entity identifier.

Preferably, the token communicated from the un-trusted communications device to the local access unit is verified by the local access unit with respect to a second parameter by the local access unit.

Preferably, the token communicated from the un-trusted communications device to the local access unit is verified by the local access unit with respect to a third parameter by the local access unit.

Preferably, the second parameter is the unique entity identifier of the entity.

Preferably, the third parameter is a secret alphanumeric sequence.

Preferably, the secret alphanumeric sequence is unique to the unique barrier identifier.

Preferably, the secret alphanumeric sequence is the unique barrier identifier.

Preferably, the secret alphanumeric sequence is a long alphanumeric sequence which characterizes the unique barrier identifier.

Preferably, the hashed value comprises a hash by a predetermined hash algorithm of a concatenation of a first secret and a first time.

Preferably, the hash algorithm uses a combination of a first secret and a first time as input.

Preferably, the algorithm is a TOTP algorithm.

Preferably, the non-hashed value comprises said at least first unique entity identifier.

Preferably, the hashed value comprises a hash by a predetermined hash algorithm of a concatenation of the first secret and the first time and the first unique entity identifier.

Preferably, the hash algorithm uses a combination of the first secret and the first time and the first unique entity identifier as inputs.

Preferably, the non-hashed value comprises said at least first unique entity identifier and said unique barrier identifier.

Preferably, the token is verified by the local access unit by the steps of:
deconstructing the alphanumeric sequence contained in the received token into a received hashed value and a received non-hashed value;
identifying at least a portion of the received non-hashed value as a received portion;
applying the predetermined hash algorithm to at least a time derived from a local source which is local to the local access unit.

Preferably, a hash is generated from the combination of a secret with an entity ID with an XOR operation, thereby to generate a per entity secret.

Preferably, a TOTP hashing is performed using the per entity secret and the current time to generate a unique hash for the entity at the current time.

Preferably, the hash is dependant on some fixed combination of the current time, the entity ID and the secret.

In a further broad form of the invention there is provided, a method allowing access through a locked or secured barrier to pre-authorized users, identified/validated by a security token sent directly from a user's mobile phone to a local access unit.

Preferably, the security token sent from the mobile phone is issued by a server in communication with a web-enabled database.

Preferably, the security token is a hash of a time based one-time password, generated by an algorithm and the current time (rounded to the nearest minute), a unique user ID, and a shared secret.

Preferably, the method utilises a time based one time password, using the current time, and an adjusted secret generated by a combination of the unique user ID and the shared secret using an XOR operation.

Preferably, the current time is rounded to the nearest time block.

Preferably, the time block is 30 seconds.

Preferably, the security token is sent directly from the pre-authorized user's smart phone via Bluetooth or other Bluetooth Low Energy signal following a command from an application installed on the smart phone, either initiated manually by the user or automatically by the application when it identifies it is near the local access unit.

Preferably, the local access unit identifies the pre-authorised user by comparing the components of the security token relating to the time of day (rounded to the nearest minute) and shared secret.

Preferably, there are two copies of the shared secret, one copy is stored on the local access unit, and the other is stored on the web-enabled database.

Preferably, the shared secret is stored on the local access unit on manufacture and is specific to that controller.

Preferably, the shared secret is never passed to the smart phone.

Preferably, the time required by the local access unit is determined by a clock which is part of the device and periodically synchronised with the backend computer.

Preferably, the unique user ID is generated using an email address, or other unique information.

Preferably, the users are assigned to a group or set of users with specific rules surrounding access permission.

Preferably, upon identification/validation, the access device will record the user identifier locally, and not allow access again for the time block in which the user has already authenticated.

Preferably, the local access unit is directly connected to the main board of the barrier.

Preferably, the local access unit receives power from the barriers circuitry.

Preferably, the local access unit is connected as a master override for the barrier controller.

Preferably, the local access unit triggers the barrier relay by a pulse to the master override for the barrier to bring two normally open contacts closed, or two normally closed contacts open, thereby triggering the barrier to open, and bypassing any logic in the barrier controller.

Preferably, the local access unit may be connected to multiple barriers simultaneously and open them in a coordinated fashion to allow full access once access has been granted.

Preferably, a clock of the local access unit is periodically synchronised to the back end computer using a radio frequency network such as LoRaWAN or SigFox.

Preferably, the clock is synchronised within a fixed error by accounting for known delays in the network.

Preferably, the local access unit uses a radio frequency network to report back information about it's current status at regular intervals.

Preferably, the user access is controlled using a back end computer hosting an online dashboard usable only by authorised users.

Preferably, a hash is generated from the combination of a secret with an entity ID with an XOR operation, thereby to generate a per entity secret.

Preferably, a TOTP hashing is performed using the per entity secret and the current time to generate a unique hash for the entity at the current time.

Preferably, the hash is dependant on some fixed combination of the current time, the entity ID and the secret.

Preferably, the hash algorithm for generating the hash uses a combination of a first secret and a first time as input.

Preferably, the algorithm is a TOTP algorithm.

In a further broad form of the invention there is provided, a boom gate controller assembly comprising:

A receiver unit;

The receiver incorporating a processor and memory for execution of decrypt, authenticate and verify steps on data contained in a token received by the receiver unit;

the controller storing a key in memory for use in decrypting the token.

Preferably, a hash is generated dependant on some fixed combination of the current time, the entity ID and the secret.

Preferably, a hash is generated from the combination of a secret with an entity ID with an XOR operation, thereby to generate a per entity secret.

Preferably, a TOTP hashing is performed using the per entity secret and the current time to generate a unique hash for the entity at the current time.

Preferably, the hash algorithm for generating the hash uses a combination of a first secret and a first time as input.

Preferably, the algorithm is a TOTP (time based one time password) algorithm.

Preferably, the algorithm utilises a time based one time password, using the current time, and an adjusted secret generated by a combination of the unique user ID and the shared secret using an XOR operation.

Preferably, the current time is rounded to the nearest time block.

Preferably, the time block is 30 seconds.

Preferably, the receiver unit is a radio receiver.

Preferably, the receiver unit is a QR code or barcode receiver.

Preferably, the receiver unit is an NFC receiver.

Preferably, the receiver unit is a WIFI receiver.

BRIEF DESCRIPTION OF DRAWINGS

Embodiments of the present invention will now be described with reference to the accompanying drawings wherein.

DESCRIPTION OF EMBODIMENTS

Broadly speaking, in preferred forms the present invention combines and extends previous ideas. It uses the idea of using a mobile phone to communicate via blue tooth directly to a local access unit (US 2013326595), however does not require the local access unit to store a local database. In preferred forms the present invention uses time based passwords so that the local access unit does not need to be connected to a network (US20140068247). That is, it does not need to be in communication with a remote database in order to carry out its function of providing selective access to a secured location.

In preferred forms a token is sent to the portable digital communications device such as a smart phone from the web enabled database. The token contains data comprising a password which is constructed using the time and a secret specific to the local access unit of interest. An authorised password is identified by the local access unit by matching the password contained in a token to a local password it can generate using the current time and the secret. Each local access unit has its own secret. The Web enabled central server issues the password to the mobile device, following a valid booking, and then the mobile sends this via blue tooth or other short range communications facility to the local access unit. This differs from US 2013326595 because the password goes via the mobile phone from the central server rather than directly to the local access unit from the central server. That is, in preferred forms the present invention does not require the local access unit to connect to an external database in order for it to perform its function. The local access unit only needs to know the current time to compare passwords. A user ID is also sent by the mobile phone and this is used to ensure that each user is only granted access once for the time period matching the password sent. This is an extension on US 20140068247 which does not use User IDs but grants access whenever the correct time-based code is presented. Embodiments of the present invention have the advantage that barriers may be retrofitted quickly and easily, since communication between the local access unit and a central server does not need to be maintained. Despite this it can still identify entities and prevent multiple access for the same entity. In preferred forms, each user or entity has their own access code or user ID. This assists in minimising the opportunity for multiple access by a user or entity.

First Preferred Embodiment

Figure 1:
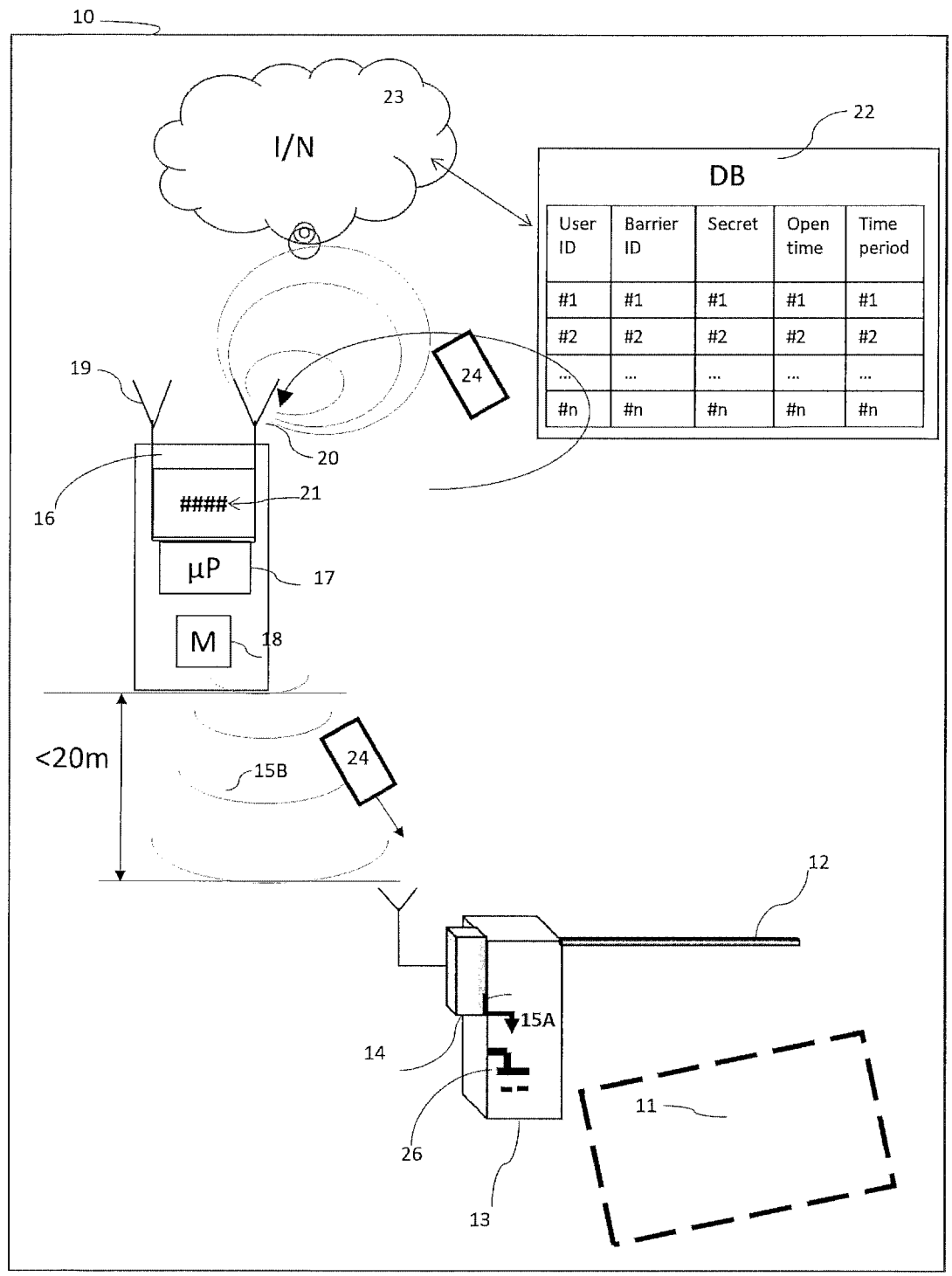
FIG. 1 is a block diagram of an implementation of the system in accordance with a first preferred embodiment.

FIG. 1 is a block diagram of an implementation of the system in accordance with a first preferred embodiment.

With reference to FIG. 1 there is illustrated an access control system 10 in accordance with a first preferred embodiment of the invention.

In this instance the system 10 provides selective access to a secured location 11. In this instance the location 11 is secured by a barrier. In this instance the barrier takes the form of a mechanical barrier 12. In other instances, the barrier may take a non-mechanical form—for example a light barrier. In this instance, the opening and closing of the barrier 12 is performed by a barrier controller 13. Typically, the barrier controller 13 is activated in order to permit access to secured location 11 by an open signal 15A. In a preferred form the open signal 15A derives from an external source. The issuing of the signal may itself be subject to security logic. In other instances, no security logic may be required—for example where egress is required for safety or statutory reasons and in such instances the signal may be effected by a simple manually operable push button.

In this instance a local access unit 14 provides the open signal 15 to activate the barrier controller 14. In this instance the local access unit 14 does incorporate security logic.

The local access unit 14 is itself in short range, low power communication with a portable digital communications device 16. In preferred forms the range is no more than 20 meters. In preferred forms the communication is radio communication.

In one preferred form the portable digital communications device is in the form of a smart phone containing within it at least a processor 17, a memory 18, a short range low-power communications device 19, a long-range communications device 20 and an input/output interface 21.

The portable digital communications device 16 communicates with a web enabled database 22. In preferred forms the communication includes a communications path comprising initially the long-range communications device 20 together with the Internet 23.

In use, the Web enabled database 22 issues a session token which is received by the portable digital communications device 16 preferably via its long-range communications device 20. In this instance the session token 24 is communicated at time of use from the portable digital communications device 16 to the local access unit 14 by way of the short range low-power communications device 19.

The local access unit 14 decodes the session token 24. In a preferred form the decoding is performed by use of a key 25. In one form the key may take the form of a secret. Subject to an authentication and verification step performed on the data decoded from the token 24 the local access unit 14 issues the open signal 15 whereupon the barrier controller 13 causes the barrier 12 to retract or raise as the case may be in order to provide access to the secured location 11.

In a preferred form the signal 15A causes a normally open contact on a barrier controller override mechanism to close thereby making use of a barrier override function to cause the barrier to open.

In preferred forms the key 25 for coding and decoding the session token 24 is stored only on the local access unit 14 and on the Web enabled database 22. Specifically it is not stored on the portable digital communications device 16. The portable digital communications device acts only as a "passthrough" mechanism for the token which is to say a token relay communications mechanism. Stated another way it is a token store and forward mechanism.

In a preferred form the token is forwarded from the portable digital communications device 16 to the local access unit 14 at the time that a user of the portable digital communications device 16 wishes to gain access to the secured location 11.

As previously stated the forwarding of the session token 24 to the local access unit 14 and its receipt by the local access unit 14 does not guarantee that signal 15 A will be generated then or at all.

In this instance, the generation of signal 15A is dependent on decoding, authentication and verification steps executed by a processor within local access unit 14 on the data contained in the session token 24.

Figure 2:
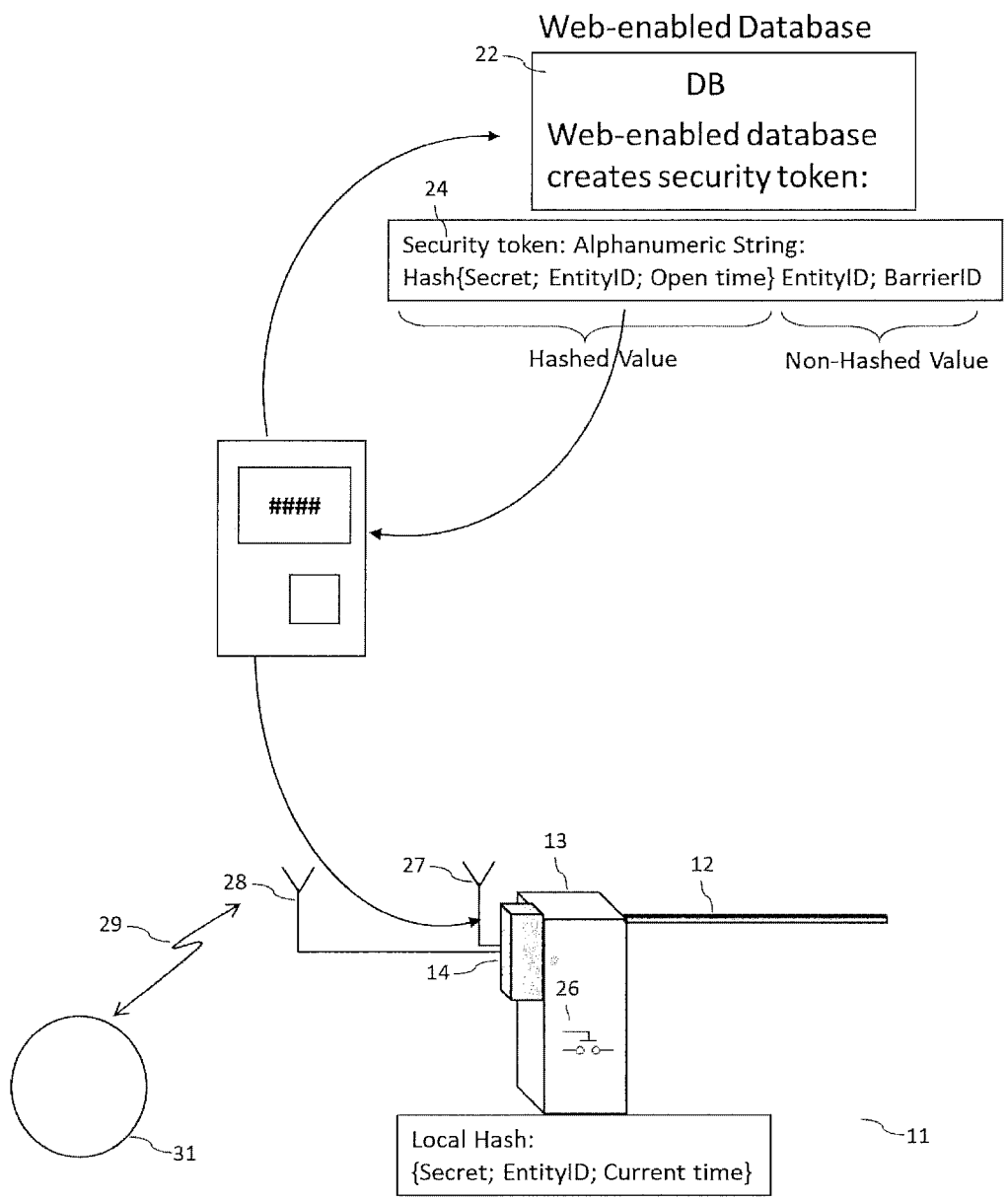
FIG. 2 is a block diagram of a further implementation of the system in accordance with a second preferred embodiment.

FIG. 2 illustrates the components of a system 30 in accordance with a second preferred embodiment wherein like components are numbered as for the arrangement of FIG. 1. Access to the secure area 11 is blocked by a barrier 12 in this instance in the form of a boom gate, security door, or other movable barrier. This barrier may have a master override 26 so that the local access unit 14 can directly connect and signal the barrier controller 13 to open the barrier 12. In this instance the local access unit 14 is mechanically fastened to the casing of the barrier controller 13. In this instance, it is wired to a normally open contact of the barrier override mechanism 26. In this instance, it derives power from the barrier controller 13.

The local access unit, 14, in this instance has two aerials, 27, 28. A first aerial 27 is adapted to receive short range low power radio signals 15B including signals such as blue tooth or NFC. A second aerial 28 is adapted to receive low frequency timing signals 29 from the SigFox network or other time source 31.

Bookings for the secured location 11 such as for car spots may be made via a portable digital communications device 16 such as a smart phone that is in mobile data communication through an application 32 executing on the portable digital communications device 16 with a web enabled database 22 which is located remotely from the portable digital communications device 16 and also remotely from the local access unit 14 and barrier controller 13. The Web enabled database 22 sends to the smart phone a security or session token 24 containing the individual's/entity's entity ID, a time based one time password, and a secret code specific to the local access unit 14 from which the smart phone will be requesting access via the token transmission. In a preferred form the token 24 contains a hash of a concatenation of the secret, the entity ID and the agreed/authorised open time. It may also contain (non-hashed) the entity ID which has been authorised for that open time and also (non-hashed) the barrier ID for the barrier controller 13 associated with a local access unit 14 for which entry has been authorised.

In a preferred form the token is communicated over the Internet and/or bold telecommunications network to a portable digital communications device, preferably a smart phone where it is held until the smart phone is within range of the local access unit 14 at which time, either by way of user prompt or by virtue of the act of coming into range, the token is then forwarded via a short range communication capability such as Bluetooth to the local access unit 14.

The local access unit, on receipt of the token, creates a local hash comprising a concatenation of the secret, the entity ID and the current time (as available locally to the local access unit 14). The value contained in the token is separated from the non-hashed value contained in the token and the hashed value in the token is then compared with the local hash. If they match then an open signal is provided to the barrier controller 13. The entity ID derived from the token may be stored at least for the session for the purpose of detecting and then rejecting repeat entry requests from tokens containing the same entity ID for the same session.

In an alternative preferred form a hash is generated from the combination of a secret with an entity ID with an XOR operation, thereby to generate a per entity secret. A TOTP hashing may be performed using the per entity secret and the current time to generate a unique hash for the entity at the current time.

In preferred forms the hash is dependant on some fixed combination of the current time, the entity ID and the secret.

Stated another way: To request access after a booking has been made, in this instance a blue tooth signal, 15B, is sent from the smart phone, 16, owned/controlled by the individual/entity seeking access. It sends a security or session token 24, that has been communicated to it from the web enabled database 22.

The local access unit 14 compares the components of the security or session token 24 for the time of day and the shared secret the local access unit 14 received on manufacture or installation. If these match, with a tolerance on the time of day allowing for slight differences in time base used by the Web enabled server 22 and the time base used by the local access unit 14, then access will be granted. Once access is granted the local access unit 14 stores the entity ID component of the security or session token 24 so that a second request from the same user/entity will be rejected if made for the same predefined time period.

Figure 3:
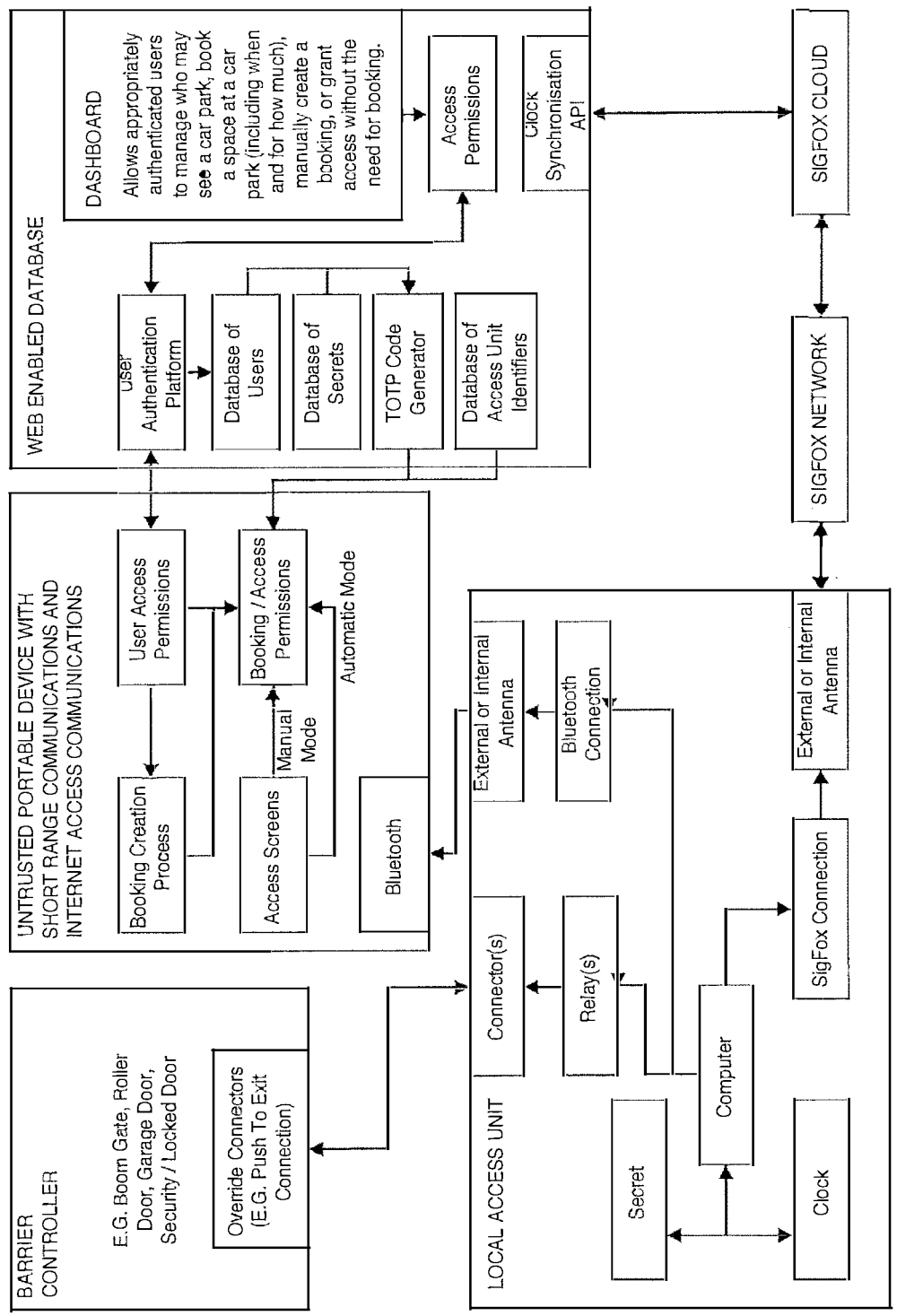
FIG. 3 is a block diagram of an exemplary implementation of the system of FIG. 2.

FIG. 3 is a block diagram of an exemplary implementation of the system of FIG. 2.

Figure 4A:
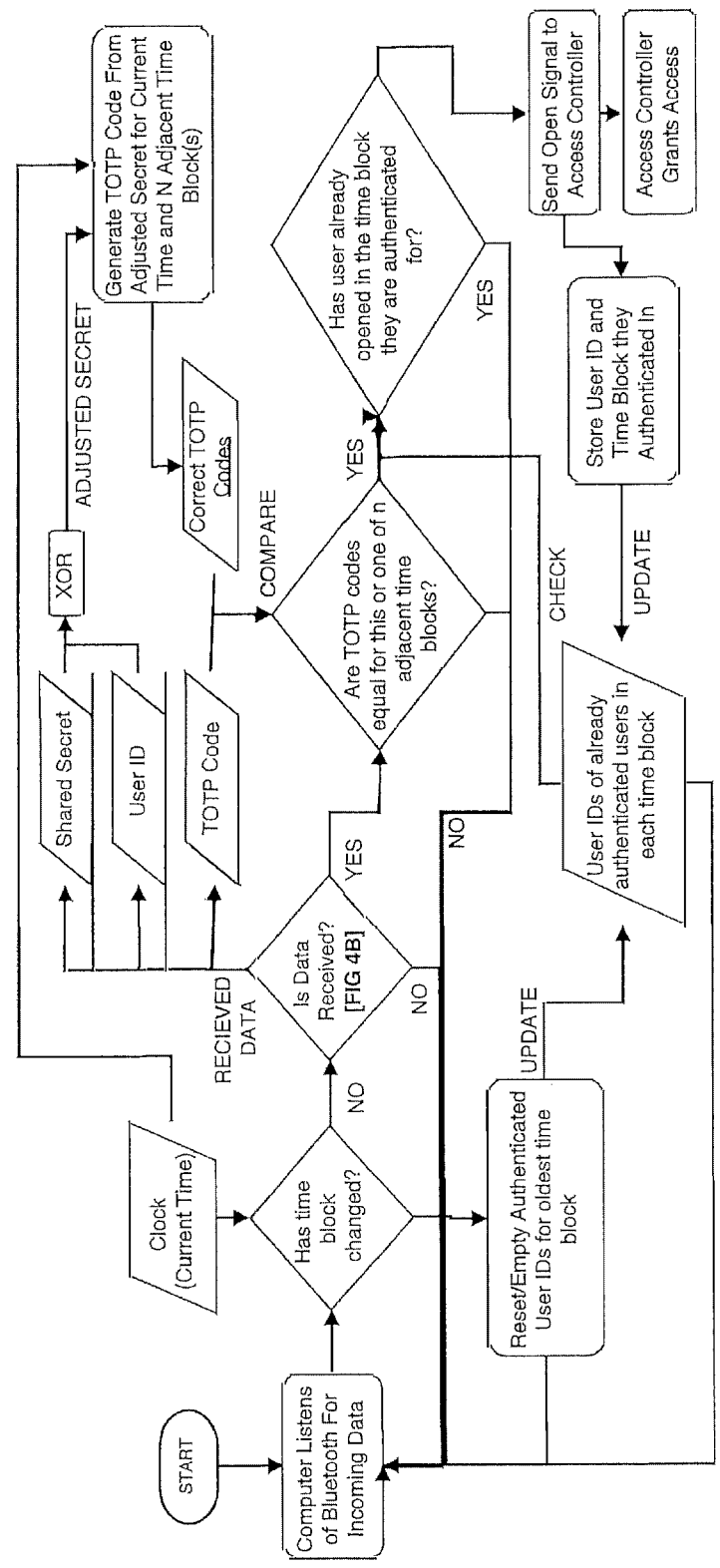
FIG. 4A,B,C,D is a flowchart of the implementation of FIG. 3.
Figure 4B:
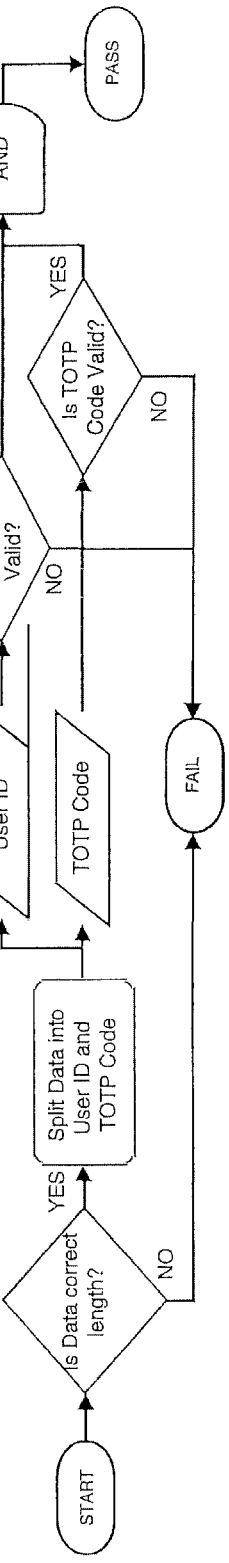

FIG. 4A,B,C,D is a flowchart of the implementation of FIG. 3

So that the time based one time password is generated correctly it is preferred that both the Web enabled database 22 (issuing security or session token 24 to the smart phone) and the local access unit 14 both have the correct (same) time to a predetermined level of accuracy. In this instance the local access unit 14 has an internal clock, which is periodically, preferably approximately every 6 hours, synchronized using the SigFox radio network in order to maintain accurate time. In a particular form it may also be synchronised against the same time base used by the Web enabled database 22. FIG. 4C illustrates the logic of the time synchronization process utilised in this instance.

In alternative forms a time source located within the local access unit 14 may be such as to maintain time accuracy to a sufficient level over a significant period of time without requiring synchronisation against an external time reference.

The smart phone receives the security or session token, 24, through the application 32. It also must search, automatically or manually, for the blue tooth device representing the local access unit 14. FIG. 4D provides a flow chart illustrating the process followed by the smart phone requesting access, as it generates and then sends the token containing access code data to the local access unit.

In a further embodiment, a booking may be made that allows multiple entries in a specified time period. A new security or session token 24 *a* may be requested for every new entry, as required, without charge provided it falls within the booking time.

In a further embodiment the web-enabled database can associate individual users to groups bound by the same rules. For example a user working for a specified company may be associated with that companies group and only be able to make bookings at a time that the company has preapproved, and at a company specific price.

In Use

The user is granted access to be in a secured area for a specific time range (i.e. 9-5) or set of time ranges (9-5, mar 1, mar 2 . . . ).

The user can request (from the server) and be given a token containing the current password at any time in the time range in which they have been granted access.

In a particular form groups of users can be authorised: in this instance the Web enabled database or backend computer allows bookings to be made by any member in a group of users. Access is then granted to individual users based on their bookings.

The flow is:

1. Group of users created, e.g. staff.
2. A set of parking spaces (or the car park) is made available to the group of users at specific times and prices (possibly free).
3. The users then book parking spaces, possibly making a payment.
4. Access is granted to each user for each booking they make individually.

In a preferred form the barrier 12 is raised by sending to the barrier controller a control signal to open, with one configuration acting as a master override by bringing the two normally open override contacts 26 closed for a short duration (in this case by pulsing a relay in this instance located in the local access unit 14—other electrical components may achieve the same effect).

In this particular preferred form, access is granted when the normally open contacts 26 are closed, but they must be opened again after a short time (hence the pulse) to prevent other behaviours, such as lockdown mode where the boom gate may refuse to open.

Figure 5:
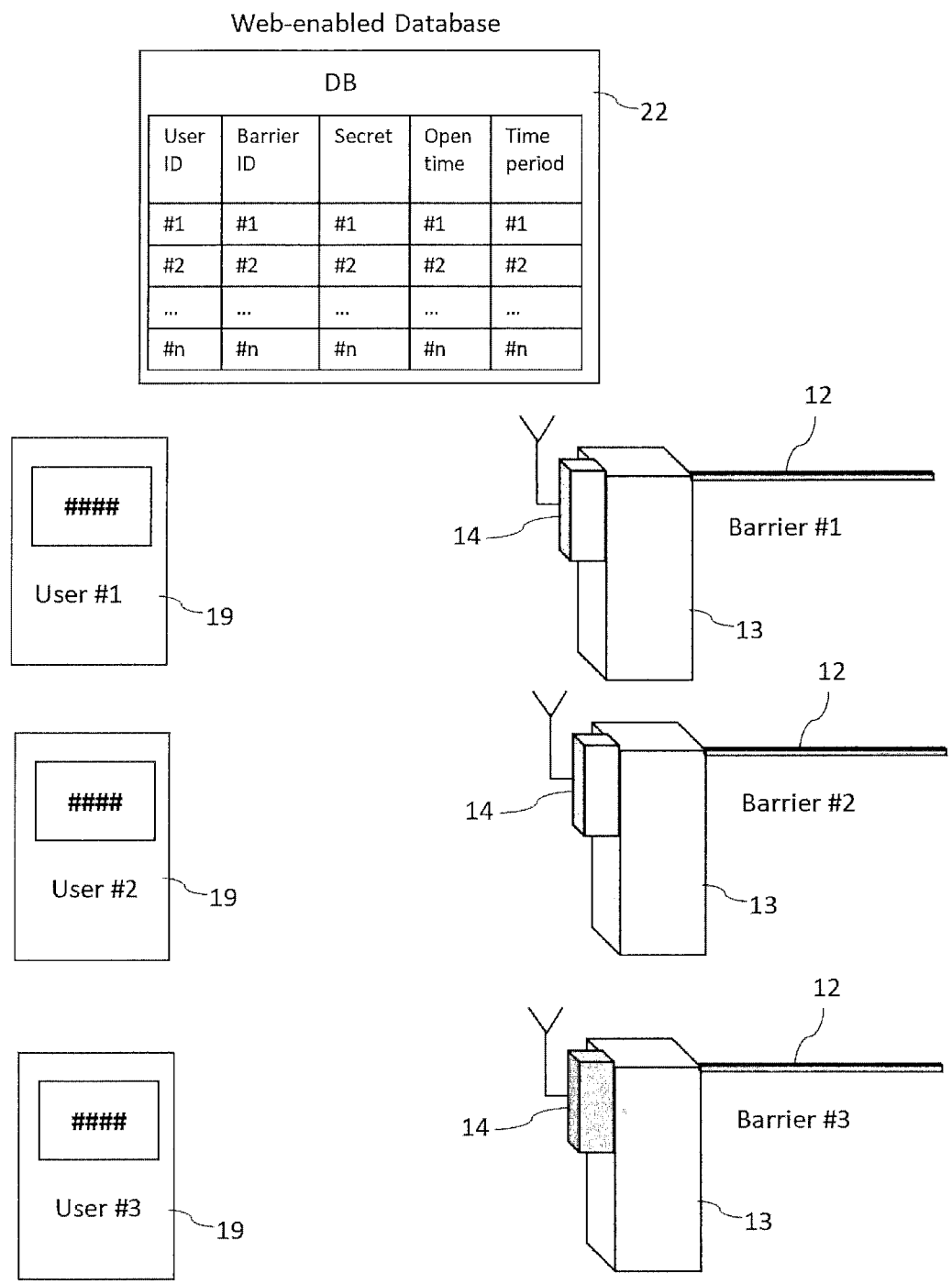
FIG. 5 illustrates a multi-user networked implementation of the system of any one of FIGS. 1 to 4.

FIG. 5 illustrates a multi-user networked implementation of the system of any one of FIGS. 1 to 4.

INDUSTRIAL APPLICABILITY

Embodiments of the invention may be applied for providing selective access to secured areas, the access provided by the opening of a boom gate or the like, the boom gate being opened if and only if defined conditions have been met.

The invention claimed is:

1. An access control system for permitting access to an entity to a secured location, the access control system comprising:
a local access unit;
a barrier controller;
an untrusted portable device in communication with the access control system;
the entity identified by a unique entity identifier accorded to the entity;
entry to said secured location secured by a barrier;
said barrier identified by a unique barrier identifier accorded to the barrier;
the local access unit is located local to the barrier;
the barrier controller is used for actuating the barrier;
wherein said system generates an access token and communicates the access token to the untrusted communications device;
said local access unit issuing an open signal to the barrier controller whereby the barrier permits the entity access to the secured location if and only if data contained in the access token communicated from the untrusted communications device to the local access unit is verified by the local access unit, wherein the access token is unique per entity per barrier; and wherein said local access unit validates the access token without retrieving the unique entity identifier of the entity from a stored list of unique entity identifiers;

wherein the access token is verified by the local access unit by the steps of:

deconstructing the received access token into a received hashed value and a received non-hashed value;

identifying at least a portion of the received non-hashed value as a received portion;

applying a predetermined hash algorithm to at least a time derived from a local source which is local to the local access unit, wherein the access token is verified by the local access unit with respect to a second parameter and a third parameter, wherein the second parameter is the unique entity identifier of the entity, and the third parameter is a secret alphanumeric sequence;

wherein the unique entity identifier received in the non hashed value in combination with verification of the access token with respect to the derived time, unique entity identifier and the the secret alphanumeric sequence enables the local access unit to verify that the unique entity identifier is correct without prior knowledge of the entity, and that the entity is authorized for access at the current time; and whereby the access token is a one time token for the current time transmitted over a non-networked path from the untrusted portable device to the local access unit.

2. The system of claim 1 wherein data in the access token is created by a step of hashing data at a location remote from the local access unit.

3. The system of claim 1 wherein the access token is not created by the local access unit.

4. The system of claim 1 wherein the step of hashing is performed at a location not in direct networked communication with the local access controller.

5. The system of claim 1 wherein the step of hashing is performed at a web enabled database located remote from the local access unit.

6. The system of claim 1 wherein the local access unit includes a short range communications module for communication with the untrusted communications device.

7. The system of claim 1 wherein the local access unit is not in communication with a token generator.

8. The system of claim 1 wherein the first parameter is time.

9. The system of claim 1 wherein the first parameter is a barrier open time.

10. The system of claim 1 wherein the first parameter is a pre-authorised barrier open time.

11. The system of claim 10 wherein the first parameter is a preauthorised barrier open time authorised with respect to the unique entity identifier.

12. The system of claim 1 wherein the secret alphanumeric sequence is unique to the unique barrier identifier.

13. The system of claim 1 wherein the secret alphanumeric sequence is the unique barrier identifier.

14. The system of claim 1 wherein the secret alphanumeric sequence is a long alphanumeric sequence which characterizes the unique barrier identifier.

15. The system of claim 1 wherein the hashed value comprises a hash by a predetermined hash algorithm of a concatenation of a first secret and a first time.

* * * * *